United States Patent
Nimmala et al.

(10) Patent No.: US 10,728,850 B2
(45) Date of Patent: Jul. 28, 2020

(54) DEVICE, SYSTEM, AND METHOD FOR A HIGH POWER MODE FOR A CELLULAR CONNECTION

(71) Applicant: APPLE INC., Cupertino, CA (US)

(72) Inventors: Srinivasan Nimmala, San Jose, CA (US); Srirang A. Lovlekar, Cupertino, CA (US); Venkateswara Rao Manepalli, San Jose, CA (US); Sami M. Almalfouh, San Jose, CA (US); Li Su, San Jose, CA (US); Jianxiong Shi, Dublin, CA (US); Daniel D. Schucker, Dublin, CA (US); Ajoy K. Singh, Milpitas, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/135,705

(22) Filed: Sep. 19, 2018

(65) Prior Publication Data
US 2019/0021057 A1    Jan. 17, 2019

Related U.S. Application Data

(62) Division of application No. 15/595,465, filed on May 15, 2017, now Pat. No. 10,085,213.

(51) Int. Cl.
*H04W 36/06* (2009.01)
*H04W 52/24* (2009.01)
(Continued)

(52) U.S. Cl.
CPC ...... *H04W 52/0229* (2013.01); *G06F 1/1698* (2013.01); *G06F 1/3209* (2013.01); *H04W 52/0261* (2013.01); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/142* (2018.01);
(Continued)

(58) Field of Classification Search
None
See application file for complete search history.

(56) References Cited

U.S. PATENT DOCUMENTS

2009/0257353 A1* 10/2009 Song .................... H04W 24/02
                                                           370/241
2015/0373772 A1* 12/2015 Watanabe ......... H04W 36/0055
                                                           455/436

(Continued)

*Primary Examiner* — Ajit Patel
(74) *Attorney, Agent, or Firm* — Fay Kaplun & Marcin, LLP

(57) ABSTRACT

A device, system, and method uses a high power mode for a cellular connection. The method is performed at a device that is configured to establish a network connection to a network. The method includes detecting a number of at least one event that has occurred over a time period, the at least one event associated with operations used through the network connection, the at least one event indicative of a power to perform the operations that is greater than a predetermined power. When the number is at least a predetermined threshold, the method includes identifying the network connection as being in a high power state. The method includes activating settings when the network connection is in the high power state, the settings reducing a usage of the operations over the network connection.

20 Claims, 6 Drawing Sheets

(51) Int. Cl.
  *H04W 52/14*  (2009.01)
  *H04W 36/30*  (2009.01)
  *H04W 36/00*  (2009.01)
  *H04W 52/02*  (2009.01)
  *G06F 1/16*  (2006.01)
  *G06F 1/3209*  (2019.01)

(52) U.S. Cl.
  CPC ............ *Y02D 70/144* (2018.01); *Y02D 70/21* (2018.01); *Y02D 70/23* (2018.01); *Y02D 70/24* (2018.01); *Y02D 70/26* (2018.01)

(56) References Cited

U.S. PATENT DOCUMENTS

| | | | |
|---|---|---|---|
| 2016/0037425 A1* | 2/2016 | Van Lieshout | H04W 36/08 370/332 |
| 2016/0269952 A1* | 9/2016 | Moon | H04W 76/18 |
| 2018/0007605 A1* | 1/2018 | Eriksson | H04W 24/10 |
| 2018/0343598 A1* | 11/2018 | Xu | H04W 36/08 |

\* cited by examiner

DEVICE, SYSTEM, AND METHOD FOR A HIGH POWER MODE FOR A CELLULAR CONNECTION

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

Despite the various ways that the UEs may connect to networks or with other UEs, the UE may be a cellular link budget limited device such as a wearable device. As a cellular link budget limited device, the UE may be in a sub-optimal radio condition with a network more often than a non-link budget limited device such as a smartphone. Under a sub-optimal radio condition, a resulting user experience may become very poor (e.g., in both voice and data exchange). This sub-optimal radio condition is compounded by an increased power cost as compared to if there were more optimal radio conditions. The cellular link budget limited device may additionally have a smaller power supply than a non-link budget limited device (e.g., owing to form factor limitations of the UE).

SUMMARY

The exemplary embodiments are directed to a method, comprising: at a device that is configured to establish a network connection to a network: detecting a number of at least one event that has occurred over a time period, the at least one event associated with operations used through the network connection, the at least one event indicative of a power to perform the operations that is greater than a predetermined power; when the number is at least a predetermined threshold, identifying the network connection as being in a high power state; and activating settings when the network connection is in the high power state, the settings reducing a usage of the operations over the network connection.

The exemplary embodiments are directed to a device, comprising: a transceiver configured to establish a cellular connection to a cellular network, the transceiver being in an idle state; and a processor detecting a number of at least one event that has occurred over a time period, the at least one event associated with operations used through the network connection, the at least one event indicative of a power to perform the operations that is greater than a predetermined power, when the number is at least a predetermined threshold, the processor identifying the network connection as being in a high power state, the processor activating settings when the network connection is in the high power state, the settings reducing a usage of the operations over the network connection.

The exemplary embodiments are directed to a method, comprising: at a device that is configured to establish a network connection to a network through a base station of the network: determining uplink transmission parameters indicative of a sustainability of an uplink communication pathway of the network connection; when the uplink transmission parameters are outside a predetermined acceptable operational range, identifying the uplink communication pathway of the network connection to be unsustainable; generating a measurement report indicating a radio link failure (RLF) despite a genuine RLF event being absent; and transmitting the measurement report to the base station intended to trigger a handover procedure to a further base station of the network.

DETAILED DESCRIPTION

Figure 1:
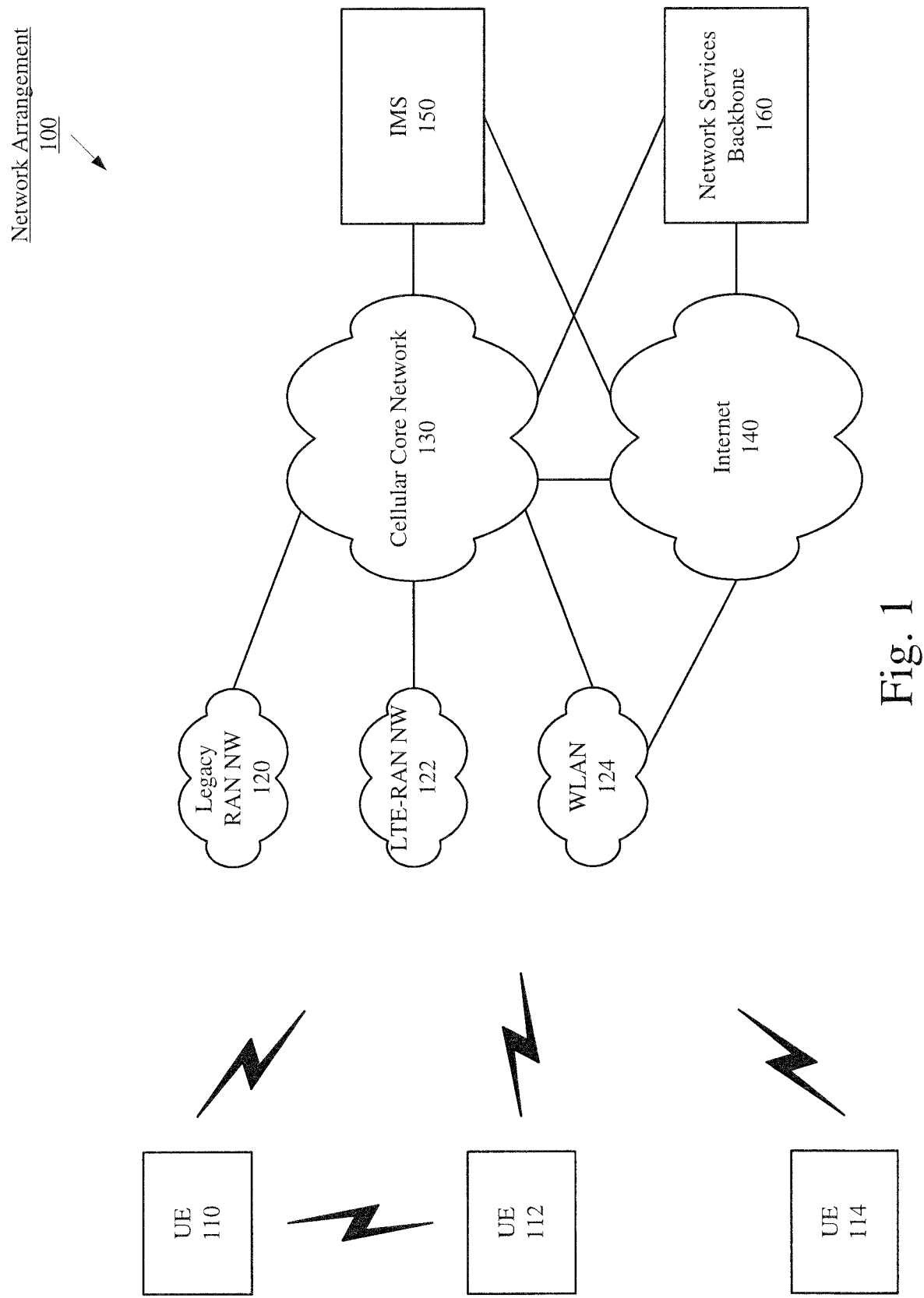
FIG. 1 shows a network arrangement according to the various exemplary embodiments described herein.

The exemplary embodiments may be further understood with reference to the following description and the related appended drawings, wherein like elements are provided with the same reference numerals. The exemplary embodiments are related to a device, system, and method for utilizing a high power mode of operation on a user equipment (UE) when the UE is in a high power state with regard to a network connection as related to a link quality monitoring (LQM). Specifically, the (UE) may be connected to a network (e.g., a Long Term Evolution (LTE) network) but a quality of the network connection may require further power to perform operations over the network in comparison to a normal state having a normal mode of operation. Accordingly, the exemplary embodiments provide a first mechanism in which the network connection is monitored to identify whether the normal mode of operation or the high power mode of operation is to be used and a second mechanism to utilize first settings associated with the high power mode of operation or second settings associated with the normal mode of operation as well as operations to switch between the first and second settings.

Initially, it is noted that the exemplary embodiments are described with regard to a UE. However, the UE is only exemplary. The exemplary embodiments may be utilized with any device that may establish a connection to a network, particularly a cellular network such as a Long Term Evolution (LTE) network, and configured with the hardware, software, and/or firmware to exchange and process data with the network. Therefore, the UE as described herein is used to represent any network capable device.

It is also noted that the exemplary embodiments are described with regard to the UE having a companion UE where the UE is a slave and the companion UE is a master. Accordingly, when the UE and the companion UE are connected to one another over a short-range communication pathway, the UE may receive data via the companion UE while deactivating any network capabilities to a cellular network and/or a WiFi network. However, when the UE and the companion UE are not connected, the UE may exchange data over any network to which it is configured to connect (instead of through the companion UE). However, the use of the UE and the companion UE is only exemplary. The exemplary embodiments may be utilized for any UE (with or without a companion UE) and represent any device.

With developments to UEs as well as further types of UEs being introduced (e.g., with the Internet of Things (IoT)), the manner in which the UEs may communicate with networks may need modification. For example, a first UE may be linked to a second UE as companions. Specifically, the first UE may be a wearable (e.g., a slave) while the second UE may be a smartphone which is the wearable's companion (e.g., master). While the wearable and the smartphone are within range of one another within the limits of a short-range communication protocol, the wearable and the smartphone may communicate such that data being received by the smartphone may be relayed to the wearable (e.g., an incoming call or text received on the smartphone may be relayed to the wearable). In this manner, the wearable may conserve a limited power supply by using only the short-range communication protocol instead of having to associate with and monitor one or more networks.

When the UE is separated from the companion UE, the UE may also be configured to independently connect to a network to exchange data without assistance from the companion UE. However, the UE may be a cellular link budget limited device. Specifically, the UE may not have as complex a transceiver or the transceiver may be configured to rely on the short-range communication pathway while a cellular network connection may be a secondary protocol. The UE may also have form factor limitations such as a reduced volume compared to the companion UE. The form factor limitation may limit the types of components that may be included in the UE. For example, the UE may not include a diversity antenna. In another example, the UE may include a power supply that is more limited than the power supply of the companion UE (e.g., a smaller maximum stored power).

In the scenario where the UE is not connected to the companion and connected to a LTE network, the above noted limitations may place the UE in a sub-optimal radio condition (e.g., a high power state) where using the network connection may require additional power and processing than if the UE is in an optimal radio condition (e.g., a normal state). Although the UE may be in a substantially similar position or location where a non-link budget limited device may experience an optimal radio condition, the UE may not be configured to optimize the network connection in a way that the non-link budget limited device is capable. If the UE is in a substantially similar position or location where the non-link budget limited device also experiences a sub-optimal radio condition, the UE may become further stressed and require even more additional power and processing. In a particular example, the UE may be within an operating area of a cell but be at a location within the cell operating area that causes the UE to experience a sub-optimal radio condition. The sub-optimal radio conditions in the location causes the UE to use additional power to perform operations with the network (e.g., require more transmit power for an uplink transmission). Furthermore, the sub-optimal radio conditions may lead to a poor user experience including requiring a longer amount of time for the user to complete a data session.

Throughout this description, the terms "optimal" radio condition(s) and "sub-optimal" radio condition(s) will be used. It should be understood that there are no specific radio conditions that qualify as optimal or sub-optimal. These terms are merely used to explain the relationship between two radio conditions. For example, during a first set of radio conditions, the UE may transmit at a first power level and during a second set of radio conditions, the UE may transmit at a second power level that is higher than the first power level. In this example, the first set of radio conditions may be considered "optimal" and the second set of radio conditions may be considered "sub-optimal."

In view of the additional limitations that the UE faces in maintaining a network connection within a tolerable optimal range (e.g., of a normal state), the exemplary embodiments provide a way to enhance use of the limited power supply by utilizing a high power mode when a high power state of the network connection is identified. Accordingly, the exemplary embodiments are directed to a first mechanism to detect and identify when the UE is under sub-optimal radio conditions in a reliable manner. The exemplary embodiments are also directed to a second mechanism to utilize a high power mode or settings associated therewith to reduce the cellular usage over the network connection when the UE is under such conditions to achieve longer life in the power supply while still considering the end user experience to minimize any impact thereto and maintaining any regulatory requirements.

It is noted that the features of the exemplary embodiments are described with regard to the UE being connected to a LTE network. However, it should be noted that the use of the LTE network is only exemplary. The exemplary embodiments may be used with any scenario in which the UE is connected to a network and a network connection with this network creates a sub-optimal state (e.g., high power state) compared to a normal state.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network), a LTE RAN (LTE-RAN) 122, and a wireless local area network (WLAN) 124 (e.g., a WiFi network). However, it should be understood that the UEs 110-114 may also communicate with other types of networks and may also communicate using a wired connection. With regards to the exemplary embodiments, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is a slave and the UE 112 is a master. Thus, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. However, it is again noted that the use of a companion relationship is only exemplary and the UE 110 may connect to one or more of the networks 120-124 whether or not the UE 110 is within range of communicating with the UE 112 over the short-range communication pathway.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. As noted above, the exemplary embodiments are described with regard to the LTE-RAN 122 but may be modified for use with the legacy RAN 120 when the cellular connection with the legacy RAN 120 becomes sub-optimal or creates a high power state on the UEs 110-114. The WLAN 124 may include any type of wireless local area network (e.g., WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

Figure 2:
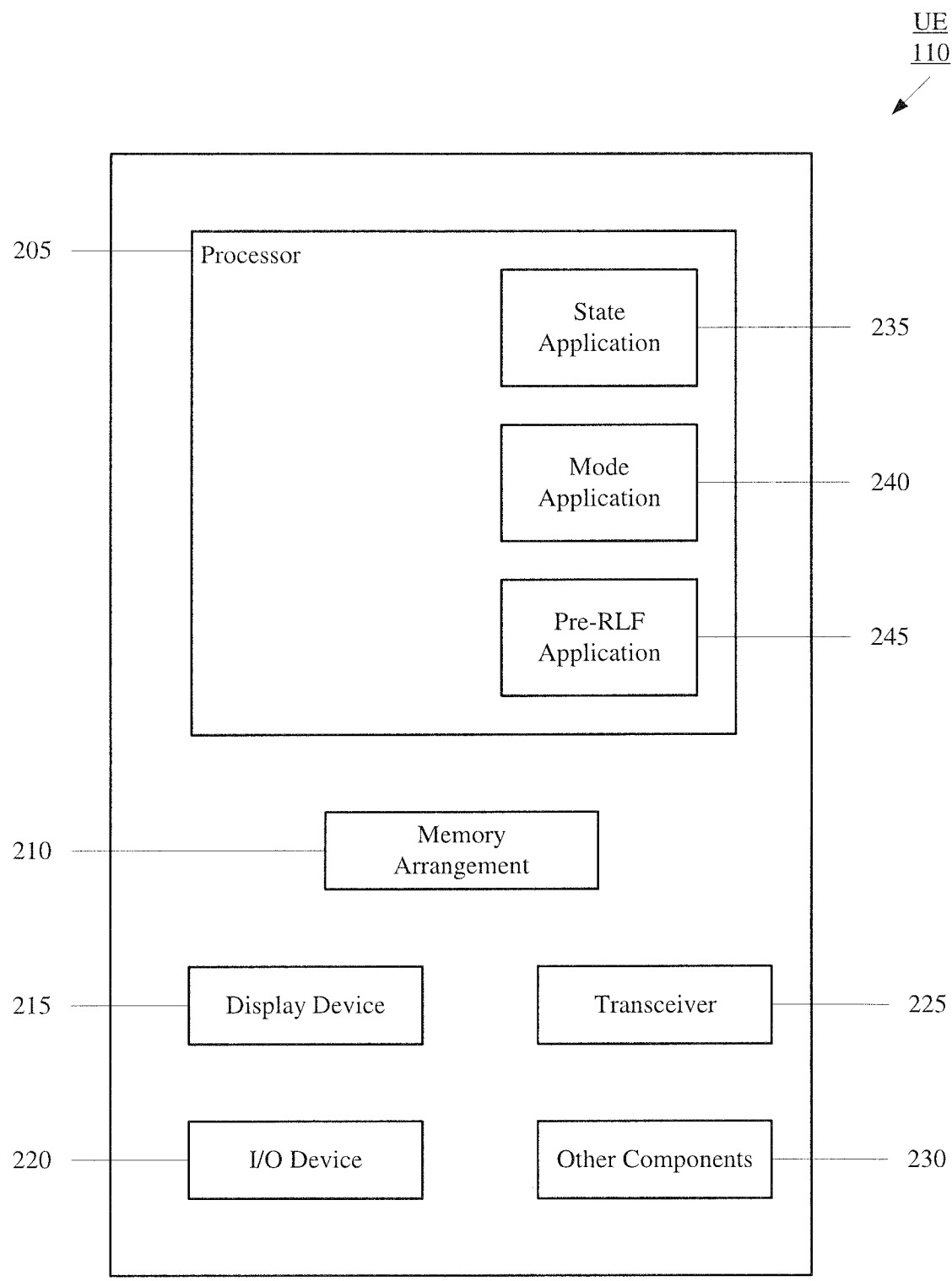
FIG. 2 shows a user equipment according to the various exemplary embodiments described herein.

The exemplary embodiments relate to the UE 110 connecting to the LTE-RAN 122 while separated from the UE 112 which is a companion master to the UE 110. FIG. 2 shows the UE 110 of the network arrangement 100 of FIG. 1 according to the exemplary embodiments. Specifically, the UE 110 is configured to execute a plurality of applications that perform functionalities to identify a state of a network connection (e.g., a cellular connection) between the UE 110 and a base station of the network (e.g., a cell) as well as determine which settings are to be used for the network connection. It is noted that the UE 110 may or may not be utilizing a short range communication protocol (e.g., with a companion UE) and may or may not also be utilizing a further network connection (e.g., a WiFi connection). It is also noted that the UE 110 being configured with the features of the exemplary embodiments is only exemplary. That is, the UE 110 may also represent the UEs 112, 114.

The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a state application 235 and a mode application 240. The state application 235 may be configured to identify the state associated with a network connection between UE 110 and a corresponding network. Specifically, the state may be a normal state or a high power state. As will be described in further detail below, the high power state may be any state in which processing and/or power requirements are greater than an upper limit of the normal state, the causes of which may vary. The mode application 240 may be configured to receive the identified state from the state application 235 to determine settings to be applied for operations associated with the network connection. As will be described in detail below, the settings may correspond to a normal mode used during the normal state and to a high power mode used during the high power state. In another example, the applications may include a pre-radio link failure (RLF) application 245. As will be described in further detail below, the pre-RLF application 245 may include a specialized set of operations that are performed for the settings corresponding to the high power mode.

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be a baseband processor that operates with an applications processor or a stack of the applications processor (as will be described in further detail below).

The memory 210 may be a hardware component configured to store data related to operations performed by the UE 110. As will be described in further detail below, the memory 210 may store data associated with connectivity information (e.g., information corresponding to the network connection) and/or operation information (e.g., information of operations performed for the network connection) for the state application 235 to perform its functionality. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to exchange data with at least one of a base station associated with the legacy RAN 120, a base station of the LTE-RAN 122 (e.g., an evolved Node B (eNB)), a router of a WLAN 124, the UE 112, etc. in an independent manner, in a singular manner (e.g., if the UE 110 is only capable of establishing a single connection at a time), or in a concurrent manner (e.g., if the UE 110 is capable of establishing one or more connections at a time). Accordingly, the transceiver 225 may operate on a variety of different frequencies or channels (e.g., set of consecutive frequencies). Therefore, the transceiver 225 may include one or more components to enable the data exchange with the various networks and UEs. One or more antennas (not shown) may be coupled to these one or more components of the transceiver 225 to enable the transceiver 225 to operate on the various frequency bands. As those skilled in the art will understand, if the UE 110 is a slave companion device or a cellular link budget limited device that has form factor limitations, the UE 110 may include only one antenna (as opposed to a multi-antenna arrangement or a diversity antenna).

As described above, the state application 235 may be configured to identify the state associated with a network connection between UE 110 and the LTE-RAN 122. The state application 235 may receive various types of information to perform its functionality. For example, the state application 235 may receive connectivity related information associated with the network connection (e.g., power being used for transmissions, received signal strength, etc.) and/or operation related information associated with the network connection (e.g., whether a particular operation had a failure or successful result). The state application 235 may utilize this information to determine various factors and combinations of factors in determining whether the network connection is in a normal state or a high-power state. Specifically, the state application 235 may detect the presence of events that are indicative of the high-power state.

In a first example, the state application 235 may determine whether there has been a random access channel (RACH) failure. As those skilled in the art will understand, the RACH is a shared transport-layer channel used to access the LTE-RAN 122. The access to the LTE-RAN 122 over the RACH may be for a variety of reasons such as to set up a call or for a burst of data exchange. For example, whenever a functionality over the LTE-RAN 122 is utilized such as a voice over LTE (VoLTE) call, the UE 110 may initially schedule a RACH with the LTE-RAN 122. Accordingly, when the transceiver 225 is activated and for all subsequent operations to be performed over the LTE-RAN 122, the establishment of the RACH between the UE 110 and the LTE-RAN 122 may be performed as data exchanges between the UE 110 and the LTE-RAN 122 must be synchronized.

Due to the nature of how the RACH operates, there may be failures in establishing the RACH. For example, the RACH may be an "open" channel where messages are not scheduled (e.g., the RACH may not have a dedicated channel). Thus, in the RACH, there is no certainty that the message will not be interfered with during transmission as it is possible that one or more UEs are attempting to connect/synchronize with the LTE-RAN 122 at the same time. When a plurality of UEs are transmitting messages at the same time for establishing the RACH, the messages may collide and result in the message transmitted by the UE 110 failing to be received by the LTE-RAN 122. As those skilled in the art will understand, this process may refer to contention and, under RACH, a contention-based RACH process. The LTE-RAN 122 may be configured with a contention resolution operation to resolve this issue. However, the number of RACH attempts by the UE 110 may be indicative of whether the network connection is in the high power state.

The above manner of the messages being transmitted to establish the RACH is based on coincidence and/or a concentration of UEs in the cell operating area. Thus, RACH failures may or may not be indicative of the high power state. For example, if the RACH attempt succeeds within a predetermined threshold attempt number, the state application 235 may assume that the attempts were made at coincidentally inopportune times. That is, the network connection is in a normal state and the RACH did not fail for purposes of determining whether the network connection is in a high power state. In contrast, if the RACH attempt does not succeed until or even after the predetermined threshold attempt number, the state application 235 may determine the RACH failure event which may be indicative of the network connection being in the high power state.

It is noted that the RACH may also fail to establish for further reasons such as the UE 110 having a sub-optimal radio condition where the network connection is not capable of transmitting the messages successfully to the LTE-RAN 122. However, through use of the above noted attempts and re-attempts within the predetermined threshold attempt number, the state application 235 may determine whether the network connection is in the high power state (although when having the sub-optimal radio condition, the probability is more likely that the RACH will fail).

In a second example, the state application 235 may determine a number of retransmission attempts that are used for uplink transmissions based on the radio link control (RLC). As those skilled in the art will understand, the RLC is a layer 2 protocol used by the LTE-RAN 122. Among the various functionalities being performed, the RLC may include a retransmission operation. Specifically, the retransmission operation may be part of an automatic repeat request (ARQ) fragmentation procedure where an uplink data packet above a predetermined size is fragmented and each fragment is transmitted (to be later concatenated by the receiving component such as the base station of the LTE-RAN 122). The objective of the ARQ fragmentation procedure is to minimize packet loss (e.g., to achieve a packet loss of 1%, 0.01%, 0.0001%, etc.). Thus, when a packet is indicated as not being received (e.g., via a NACK from the base station of the LTE-RAN 122), the RLC of the UE 110 may re-transmit the failed packet until an ACK is received.

However, the ARQ fragmentation procedure may limit the number of times that the retransmission operation may be performed. For example, the RLC may only re-transmit the same packet for a predetermined number of re-transmissions before the transmission of the packet is determined to fail (e.g., lost packet). Although there are any number of reasons that may cause the predetermined re-transmission number to be reached without an ACK, one particular reason is when the UE 110 is in the sub-optimal radio condition. Accordingly, the UE 110 may be required to re-transmit the same packet for each of a plurality of packets the predetermined number of re-transmissions. This causes the UE 110 to expend further amounts of power in re-transmitting the packets as opposed to when the UE 110 is in an optimal radio condition and a number of re-transmissions may be less.

The state application 235 may utilize the number of re-transmission attempts for a packet to identify whether the network condition is the high power state. Accordingly, if the predetermined re-transmission number is determined for the packet, the state application 235 may determine a re-transmission failure event which may be indicative of the network connection being in the high power state. The state application 235 may also eliminate false positives when a packet is lost since a perfect transmission of the packets is rare and a single packet being lost may not be indicative of the high power state. Thus, the state application 235 may require that at least a predetermined number of packets are lost or reach the predetermined re-transmission number prior to determining that the network connection is likely in the high power state.

The above determination is based on packets actually being lost. However, the high power state may also be created from re-transmission attempts constantly being required. That is, the packet loss may satisfy the objective target (e.g., 1%) but one or more packets required a high number of re-transmission attempts. Therefore, the UE 110 is still required to utilize further power in performing these re-transmission attempts as opposed to if the UE 110 had optimal radio conditions. To accommodate this scenario, the state application 235 may utilize an average number of re-transmission attempts for packets corresponding to the large data block or packets over a period of time. For example, if the average number of re-transmission attempts is at least some percentage of the predetermined maximum re-transmission number (e.g., 80%), the state application 235 may determine the re-transmission failure event which may be indicative of the network connection being in the high power state.

In a third example, the state application 235 may determine whether there has been a physical layer (PHY) abort indication. As those skilled in the art will understand, the PHY is the first layer of the seven layer Open Systems Interconnection (OSI) model used by the LTE-RAN 122 that is directed to bit-level data transmission (defining how raw bits of data are transmitted over a physical link with the LTE-RAN 122) and support of interfaces for synchronized communication. Accordingly, the PHY may be privy to connectivity and operation information. Specifically, as data is being transmitted, the PHY may determine a maximum transmit power limit (MTPL) and a power-control physical uplink shared channel (PUSCH) transmit power in transmitting this data to the LTE-RAN 122. The PHY may also determine an uplink block error rate (BLER) associated with transmitting the data to the LTE-RAN 122. It is noted that the PHY abort event may only be determined while the transceiver 225 is in the connected mode with the LTE-RAN 122.

To determine the PHY abort event that is indicative of the high power state of the network connection, the state application 235 may initially determine a difference between the MTPL and the PUSCH transmit power. When the difference is greater than a corresponding predetermined threshold, this may be a first indicator of the PHY abort event. The state application 235 may further determine the uplink BLER and whether this value is greater than a corresponding predetermined threshold. If the uplink BLER is above the corresponding predetermined threshold, this may be a second indicator of the PHY abort event. If the state application 235 determines both indicators (e.g., (1) high delta between the MTPL and the PUSCH transmit power and (2) high uplink BLER), the state application 235 may determine the PHY abort event which may be indicative of the network connection being in the high power state.

In a particular implementation of the state application 235 performing the above operations, the state application 235 may determine when a time window in which to perform the measurements has begun. The time window may be any predetermined duration of time in which the measurements are to be determined. During this time window and for each subframe within a scheduled uplink transmission, the state application 235 may receive information from the PHY to check whether a difference between the PUSCH transmit power and the MTPL is greater than a corresponding predetermined threshold. The state application 235 may also check whether the uplink BLER is greater than a corresponding predetermined threshold. Accordingly, the state application 235 may determine when both of these conditions have been satisfied to indicate an unsustainable uplink transmission condition. At the end of the time window, the state application 235 may determine the number of times that combination of conditions were met for the unsustainable uplink transmission condition. If the number of times is within a tolerable predetermined maximum, the state application 235 may determine that the PHY abort event has not occurred. However, if the number of times is beyond the tolerable predetermined maximum, the state application 235 may determine that the PHY abort event has occurred.

In a fourth example, the state application 235 may determine whether there is a high power per bit ratio. Specifically, the high power per bit ratio may relate to the uplink transmission power and a hybrid ARQ (HARQ) re-transmission power. The uplink transmission power may relate to an actual uplink transmission power used to transmit a data packet. The HARQ re-transmission power may relate to a an actual HARQ re-transmission power used to re-transmit a data packet that was previously indicated as not being received by the base station of the LTE-RAN 122. It is noted that the high power per bit ratio event may only be determined while the transceiver 225 is in the connected mode with the LTE-RAN 122.

In a specific implementation, over a time period (e.g., 40 subframes), the state application 235 may determine (1) a difference between an expected uplink transmission power and the actual uplink transmission power and (2) a difference between an expected HARQ re-transmission power and the actual HARQ re-transmission power. As those skilled in the art will understand, based on various connectivity parameters, the transceiver 225 may determine the expected power that would be required to successfully transmit a data packet (in the uplink transmission or in the re-transmission). Accordingly, a positive difference in the actual and expected power may indicate that the network connection is in a high power state as more power is required than is expected if the network connection is in a normal state. If both the difference in the uplink transmission power and the difference in the re-transmission power are greater than a corresponding predetermined threshold, the state application 235 may determine that the high power per bit ratio event has occurred which is indicative of the network connection being in a high power state.

In a fifth example, the state application 235 may determine whether there is a grant event. The grant event may relate to the LTE-RAN 122 scheduling a grant. Specifically, the grant may be when the LTE-RAN 122 gives extremely low grant sizes over an extended period of time. For example, the extremely low grant size may be between 7 to 10 bytes and the extended period of time may be in multiples of 10 seconds such as 10, 20, 30, 40, etc. seconds. However, it is noted that the grant size and period of time for the grant event may vary depending on a variety of reasons such as the type of network and corresponding operating parameters of the network. As those skilled in the art will understand, the network to which the UE 110 is connected such as the LTE-RAN 122 defines how data is exchanged. Accordingly, the LTE-RAN 122 may define the size of the grant in which data is to be transmitted from the UE 110 to the LTE-RAN 122. When the grant size is low, the UE 110 may be required to activate the transceiver 225 more times instead of using a low power mode (e.g., as used in a connected discontinuous reception (CDRX) mode). Therefore, the UE 110 may be required to utilize more power than if the grant size were larger. Thus, if the state application 235 determines that the grant size or an average of the grant size over the extended period of time is below a predetermined threshold, the state application 235 may determine that the grant event has occurred which is indicative of the network connection being in a high power state.

The state application 235 may be configured to utilize the detection of the events in a variety of different manners in identifying when the network connection is in the high power mode or the normal mode. Specifically, the state application 235 may determine when a predetermined number of different events are detected within a time frame. For example, of the five exemplary events described above, the state application 235 may detect the RACH failure event and the PHY abort event within a given time frame. However, in one example, three different events may be detected for the state application 235 to determine that the network connection is in the high power state. Thus, the state application 235 may conclude that the network connection is in the normal mode. In another example, the state application 235 may detect the RACH failure event, the PHY abort event, the high power per bit ratio event, and the grant event over the given time frame. As at least three different events have been detected and four events being present, the state application 235 may conclude that the network connection is in the high power state. In a further example, the state application 235 may also be configured to detect when the same event has occurred a predetermined minimum number of times within the given time frame. If the same event is detected multiple times over the given time frame such as the PHY abort event occurring three times within the given time frame, the state application 235 may conclude that the network connection is in the high power state.

It is noted that the state application 235 may utilize any number of different events over any time frame. For example, the use of three events over a time frame is only exemplary and may be one, two, four, or all five. The given time frame when detecting three events may be 100 seconds. However, this too is only exemplary and the given time frame may be increased or decreased. In a particular manner of utilizing a combination of number of different events and a given time frame, a direct relationship may exist therebetween where a number of different events being detected may increase as the given time frame also increases and vice versa. If the state application 235 is configured to require detecting a plurality of different events in the given time frame, a more strict standard may be utilized to reliably identify when the network connection is in the high power state instead of the network connection being in the normal state with random detections of the events.

The state application 235 may include a security mechanism when identifying whether the network connection is in the high power state. Specifically, the state application 235 may be configured with a high power evaluation back off operation. The high power evaluation back off operation may be used to avoid redundancy, particularly when a false positive of the high power state is identified (and, as will be described below, results in the UE 110 being placed in a high power mode). From performing the various measurements and operations in detecting the events described above, the same PHY conditions may manifest as multiple high power events. As described above, the same measurements and/or factors may be used in detecting whether an event is present. Accordingly, it may be possible that the same conditions at the PHY may result in different events being detected and ultimately satisfying the requirement of the number of different events within the time period. That is, one trigger of an event may result in other triggers such that the baseband may get inundated with triggers and detection of events. However, this may not necessarily equate to the network condition being in the high power state. For example, under sub-optimal radio conditions, the uplink conditions may translate to multiple high power events being received at or near the same time (e.g., the retransmission failure event, the PHY abort event, and the high power per bit ratio event).

To avoid the above noted scenario where such events received at or near the same time cause the state application 235 to be biased toward identifying the high power state, the high power evaluation back off operation may allow a break in the detections. Specifically, the high power evaluation back off operation may be configured to utilize a timer upon detecting a particular event. Once a particular type of the event is detected, the state application 235 may initiate the timer for a given duration. During the duration of this timer, the state application 235 may select to ignore honoring a new high power event receiving during the duration of the timer even though the information indicates the presence of this high power event. Once the timer has expired, the state application 235 may again register when the high power event is detected for purposes of identifying whether the network connection is in the high power state. In this manner, the high power evaluation back off operation may allow the state application 235 to remove any bias toward the high power state when the same event is detected and/or prevent the network connection from being constantly identified in the high power state. For example, the minimum number of events may be detected for a first time period to warrant identifying the high power state. However, with the timer, a second, ensuing time period may not satisfy the minimum number of events as a first event may be repeated but not registered in this ensuing time period. It is noted that if a second event were to be absent in the first time period but detected in the second time period to replace the first event in the counter of events, the minimum number of events may be satisfied. Accordingly, this high power evaluation back off operation is directed to whether events are to be registered for consideration while the identification of the network connection being in the high power state remains an independent determination based on detected events.

The above mechanism performed by the state application 235 relates particularly to when the transceiver 225 is in the connected state with the LTE-RAN 122. However, the state application 235 may also be configured to identify whether the network connection is in the high power state while the transceiver 225 is not in the connected state (e.g., an idle state). While the transceiver 225 is in the idle state, the state application 235 may determine whether the UE 110 is located in a high power cost region of an operating area of the cell based on different measurements. In a first example, the state application 235 may measure a reference signal received power (RSRP). The UE 110 may have received connectivity information from the LTE-RAN 122 that configures a q-RxLevMin, which represents a minimum required level of the RSRP for the cell. For example, the q-RxLevMin may be set as −124 dbm. The state application 235 may compare the RSRP to the q-RxLevMin to determine whether the network connection is in the high power state. Specifically, if the RSRP is within a predetermined range from the q-RxLevMin, the network connection may be in the high power state. For example, if the RSRP is at −123 dbm. In a second example, the state application 235 may measure a signal-to-interference-plus-noise ratio (SINR). If the SINR is below a predetermined threshold, the state application 235 may determine that the network connection is in the high power state. For example, the predetermined threshold for the SINR may be less than or equal to −6 dB. It is noted that the thresholds described above for the different connectivity measurements are only exemplary.

While the transceiver 225 of the UE 110 is in the idle state, the state application 235 may utilize the above measurements in identifying the state of the network connection. In a particular implementation, the state application 235 may require that one or both of the conditions be met consistently for a predetermined time period for the network connection to be considered in the high power state. For example, the time period may be between 10 to 15 seconds. The state application 235 may require this consistent condition for the time period to avoid false positives.

As described above, the mode application 240 may be configured to receive the identified state from the state application 235 to determine settings to be applied for operations associated with the network connection. Specifically, the mode application 240 may instruct the processor 205, the baseband, and/or the transceiver 225 to utilize a particular set of settings under a mode corresponding to the identified state. That is, a first set of settings may be for a high power mode corresponding to a high power state and a second set of settings may be for a normal mode corresponding to a normal state. The second set of settings for the normal mode in the normal state may be the conventional settings used without any modification.

The first set of settings for the high power mode in the high power state may include a camp-only setting. The camp-only setting may be configured to only allow select operations to be performed by the transceiver 225 over the network connection. In a first example, the camp-only setting may allow emergency voice calls to be performed. In a second example, the camp-only setting may allow emergency messages or indications of emergency messages (e.g., in a ping) to be received (e.g., Commercial Mobile Alert System (CMAS) or Earthquake and Tsunami Warning Service (ETWS).

The above noted operations in the camp-only setting of the first set of settings may be the selected operations that are allowed to be performed. That is, a data exchange for these operations over the network connection with the LTE-RAN 122 may be enabled. Accordingly, all other operations may be ignored or remain unprocessed. In a first example, no other incoming or outgoing user activity may be allowed while the settings for the high-power mode are activated. In this manner, the UE 110 may not receive incoming voice calls, text, application notifications, etc. In a second example, no discretionary traffic may be allowed to be exchanged. Discretionary traffic may represent any background traffic that is exchanged without any user intervention or user input (e.g., without user knowledge). In a third example, the mode application 240 may ensure that any Attach or Internet protocol (IP) context is saved (e.g., for use when the UE 110 returns to the normal state and the settings for the normal mode are activated). In a fourth example, the mode application 240 may instruct the use of the pre-RLF application 245. As will be described in further detail below, the pre-RLF application 245 may provide a specialized functionality when the network connection is identified as being in the high power state. Accordingly, by utilizing the above settings when the network connection is in the high power mode, the additional power that would ordinarily be required to perform operations associated with the network connection may be conserved.

The settings in the high power mode may also include a power conservation setting or a user experience setting. The power conservation setting may be directed to minimizing power usage while the network connection is identified to be in the high power state. The user experience setting may be directed to minimizing power usage but not at the cost of the user experience. In both the power conservation setting and the user experience setting, the cellular interface with the LTE-RAN 110 (e.g., the use of the network connection) may be suspended based on the detection of the events described above within the time period without losing the IP context.

With particular regard to the power conservation setting, the cellular interface may completely be suspended such that only outgoing emergency calls or incoming emergency messages/pings are received. Thus, no user initiated activity may be allowed and all other incoming data and all other outgoing data is blocked (e.g., no voice calls, no messaging, etc.). This may provide a highest power saving.

With particular regard to the user experience setting, the cellular interface may be partially suspended such that non-user initiated activity is blocked. Specifically, discretionary traffic (e.g., cloud notifications) may be blocked while outgoing emergency calls, incoming emergency messages/pings, and any user initiated activity is allowed. Thus, when any user activity is detected, the UE 110 may exit from the high power mode and enter the normal mode so that the user requested operation may be performed. This may provide lower radio resource control (RRC) connections when the network connection is in the high power state while also affording a high power saving.

It is noted that the mode application 240 may be configured with the power conservation setting, the user experience setting, or both these settings. When configured with only one of these settings, the mode application 240 may use only the selected power conservation or user experience setting. When configured with both of these settings, the mode application 240 may select which of these settings should be used based on various factors. In a first example, the mode application 240 may have one of these settings selected as a default. In a second example, the mode application 240 may dynamically select which of these settings to use. For example, if the remaining power in the power supply is below a predetermined threshold, the mode application 240 may select the power conservation setting. However, for all other times, the mode application 240 may select the user experience setting.

The mode application 240 may consider various factors when utilizing the settings corresponding to the high power mode. The settings for the high power mode may impact a user experience, particularly when even user initiated activities are not allowed. Accordingly, based on how activating the settings for the high power mode would affect the user experience, the mode application 240 may delay entering the high power mode when one or more of the factors are determined.

In a first example, the mode application 240 may consider whether a voice call over the network connection with the LTE-RAN 122 is currently active. If there is a currently ongoing voice call, the mode application 240 may assume that the user is still using the UE 110 in performing this functionality. Thus, if a voice call is active, the mode application 240 may delay activating the settings of the high power mode until the voice call has terminated.

In a second example, the mode application 240 may consider whether foreground user data traffic over the network connection with the LTE-RAN 122 is ongoing. In a substantially similar manner, the foreground user data traffic (in contrast to discretionary traffic) may be data that is tied with user activity or user initiated activity. That is, ongoing foreground user data traffic may be indicative that the user is still using the UE 110. Accordingly, if the foreground user data traffic is ongoing, the mode application 240 may delay activating the settings of the high power mode until the ongoing foreground user data traffic has concluded or a minimum time from the last ongoing foreground user data traffic has been detected.

In a third example, the mode application 240 may determine if the display device 215 is activated. If the display device 215 is on, the mode application 240 may assume that the user is still using the UE 110 for some purpose. Accordingly, if the display device 215 is activated, the mode application 240 may delay activating the settings of the high power mode until the display device 215 is deactivated.

In a fourth example, the mode application 240 may utilize a cooling timer prior to activating the settings of the high power mode. The cooling timer may be used to prevent the mode application 240 from activating the settings of the high power mode while the cooling timer is running. The cooling timer may be a timer which may be started each time that the UE 110 has exited out of the high power mode and entered the normal mode. In this manner, the mode application 240 may prevent frequent transitions to the high power mode (and activating the corresponding settings). For example, the cooling timer may be between 3 to 5 minutes. Thus, if the UE 110 was in the high power mode and a trigger has been detected to swap from the high power mode to the normal mode, the cooling timer may be started. Even if the trigger is no longer detected during the duration of the cooling timer, the mode application 240 may prevent the high power mode from being used even though the minimum number of events were detected for a given time period. Accordingly, if the cooling timer is running, the mode application 240 may delay activating the settings of the high power mode until the cooling timer has expired.

The mode application 240 may further be configured to perform a specialized operation when the network connection is identified to be in the high power state. Specifically, upon identifying that the network connection is in the high power state, the mode application 240 may flush out any pending data from the discretionary traffic flow which is still in networking buffers corresponding to an applications processor stack. Accordingly, a transmission control protocol (TCP) reset may be sent for this discretionary traffic flow from the applications processor stack.

As described above, the applications of the processor 205 may further include a pre-RLF application 245. The pre-RLF application 245 may include a specialized set of operations that are performed for the settings corresponding to the high power mode. Specifically, the state application 235 may transmit a signal to the mode application 240 and the pre-RLF application 245 that the network connection is in the high power state. While the mode application 240 activates the above described settings and places the UE 110 in the high power mode, the pre-RLF application 245 may perform a set of operations to attempt to remove the UE 110 from being in the high power mode. As will be described in further detail below, the pre-RLF application 245 may perform a handover operation with the LTE-RAN 122 to switch from a first cell (that is identified to have a network connection in the high power state) to a second cell (that is determined to likely have an improved network connection in the normal state).

Initially, it is noted that the pre-RLF application 245 is described herein as providing a functionality that ensues from the state application 235 and/or operates in conjunction with the mode application 240. However, this manner of utilizing the pre-RLF application 245 is only exemplary. According to another exemplary embodiment, the pre-RLF application 245 may be used independently. As will become apparent below, connectivity information (particularly based on uplink transmissions) may be received by the pre-RLF application 245 to perform its functionality. That is, the pre-RLF application 245 may utilize its own determination as to whether further operations are to be performed instead of relying on the signal from the state application 235 that the network connection is in the high power state.

As described above, the UE 110 may be a cellular link budget limited device due to a variety of reasons. For example, the antenna performance may be degraded due to physical limitations or other design limitations. In another example, the UE 110 may be classified as a cellular link budget limited device if equipped with a single antenna while the LTE-RAN 122 is planned under an assumption that the UE 110 is equipped with a diversity antenna (e.g., two or more antennas). When the UE 110 is a cellular link budget limited device, in addition to the issues described above, various further issues may arise with regard to interactions or data exchange operations with the base station (e.g., serving cell or eNB of the LTE-RAN 122). For example, the UE 110 may remain connected to a base station where useful communications between the UE and the base station are unsustainable. Specifically, uplink transmissions from the UE 110 may not be received by the LTE-RAN 122 due to insufficient transmit power (e.g., due to an impaired antenna). Downlink transmissions from the base station may also not be received or may not be successfully decoded by the UE 110 (e.g., due to an impaired antenna, loss of diversity antenna in single-antenna UEs, etc.).

In particular examples of the above scenarios, the UE 110 may be a cellular link budget limited device that is connected to a cell in which a network connection to the corresponding base station is weak while one or more cells whose network connection to the corresponding base stations that are stronger may be available for the UE 110 to connect. In a first example, the UE 110 may detect a stronger cell compared to its current cell that is available for handover and transmits a measurement report to its currently connected base station to allow it to handover to the stronger cell. However, due to a limited uplink such that the current base station does not receive the uplink transmission from the UE 110, the current base station may not issue a handover command to the UE 110 to move to the stronger cell. In a second example, the current base station for the UE 110 may receive a coverage-limited measurement report from the UE 110 and, as a result, transmit a handover command to the UE 110. However, due to a limited downlink receive performance of the UE 110, the UE 110 may fail to decode the handover command and remain stuck on the current weak cell. Those skilled in the art will understand that there may be further examples that exist where the UE 110 may remain on a weak serving cell (e.g., the LTE-RAN 122 does not configure a measurement gap properly for a class of cellular link budget limited devices in which the UE 110 is included).

In view of the above issue of remaining connected to a base station of a cell over a network connection that is weak and provides an unsustainable communication pathway, the pre-RLF application 245 provides a mechanism to transmit an early RLF indication where the early RLF indication is not based on an actual RLF condition where the RLF criteria are met but based on other criteria (e.g., RLF due to failed radio link monitoring criteria is not yet satisfied yet uplink transmission is not sustainable).

In a first manner of triggering the early RLF indication, the state application 235 may monitor the uplink transmission parameters (e.g., transmission power, uplink BLER, etc.) Based on the uplink transmission parameters, the state application 235 may infer the sustainability of the uplink communication. If the uplink transmission parameters are determined by the state application 235 to consistently fall out of an acceptable predetermined range of operability, the state application 235 may translate this as an unsustainable link in the uplink direction. In a first example, a required transmit power may be greater than a maximum allowed transmit power according to UE capability, power back-off limits for a specific absorption rate (SAR), etc. In a second example, a high uplink BLEB may be consistently observed or measured. In a third example, a combination of the above conditions may be determined. Accordingly, the state application 235 may determine the unsustainability of the uplink transmission pathway for the UE 110 for the network connection to the current cell. The state application 235 may generate and transmit a signal of this determination to the pre-RLF application 245 for subsequent operations to be performed (e.g., utilizing the early RLF indication).

As noted above, the pre-RLF application 245 operating in conjunction with the state application 235 is only exemplary. Thus, in a second manner of triggering the early RLF indication, the pre-RLF application 245 may include the functionalities of the state application 235 described above to determine the above noted conditions for the uplink transmission pathway. In this manner, the pre-RLF application 245 may determine the unsustainability of the uplink transmission pathway for the UE 110 for the network connection to the current cell. The pre-RLF application 245 may then prepare for subsequent operations to be performed (e.g., utilizing the early RLF indication).

When the pre-RLF application 245 receives a signal or determines that the uplink transmission pathway is unsustainable or the early RLF indication is to be utilized, the pre-RLF application 245 may attempt to force the current cell to perform a handover procedure. For example, a measurement report may be generated that corresponds to an actual RLF condition (again, an actual RLF may not be the case). This measurement report may be transmitted to the current cell to force the current cell to find a better cell within the supported radio access technologies (RATs).

It is noted that the pre-RLF application 245 may have features to perform the above noted functionality in an improved manner. Specifically, after the early RLF indication is triggered, the UE 110 may temporarily bar the current weak cell from an acquisition database. By omitting the current weak cell or other determined weaker cells than the current weak cell, the UE 110 may avoid returning to the weak cell or associating with an even weaker cell while coverage conditions for the weak(er) cell does not change. In this manner, the handover procedure may be used for only stronger cells. It is also noted that the above noted functionality of the pre-RLF application 245 being directed to the uplink transmission pathway is only exemplary. According to other exemplary embodiments, the pre-RLF application 245 may be modified to be used for downlink transmission pathways or both uplink and downlink pathways.

It is further noted that when the pre-RLF application 245 is used in an independent capacity, the functionalities of the state application 235 and the mode application 240 may potentially be bypassed. For example, the conditions described above to activate the settings for the high power mode when the network connection is determined to be in the high power state may require a plurality of different events to be detected. However, prior to the plurality of different events being detected for the high power state of the network connection (e.g., a first time period of detecting the events does not detect the plurality but a second ensuing time period does detect the plurality), the conditions for triggering the early RLF indication may be determined. Thus, before the high power state is identified, the pre-RLF application 245 may have utilized the early RLF indication and performed a successful handover to a strong cell having a sustainable network connection. Accordingly, the network connection may not be determined to ever be in the high power state that requires the high power mode and the corresponding settings.

By utilizing the high power mode and the settings corresponding to the network connection being in the high power state, the exemplary embodiments provide a mechanism to minimize power usage (and maximize power conservation) as an operation that would normally be performed with a first power amount when the network connection is in the normal state requires a second greater power amount when the network connection is in the high power state. Accordingly, the exemplary embodiments may be used to reduce the cellular usage to a maximum degree while the network connection is identified in the high power state to achieve a longer life of the power supply. The exemplary embodiments are also configured to consider the overall user experience while providing this power conservation feature such that the user is minimally impacted from the use of the high power mode.

Once the UE 110 is placed in the high power mode with the corresponding settings being activated, the mode application 240 may be further configured to remove the UE 110 from the high power mode back to the normal mode with its corresponding settings when one or more of a variety of conditions are determined. Initially, it is noted that the state application 235 may continue to perform its functionalities. However, in addition to the above noted operations of determining when the network connection is in the high power state, the state application 235 may perform opposite functionalities to determine when the network connection is in the normal state. For example, if a transmission power and a retransmission power used in uplink transmissions are at or even below an expected power level, the state application 235 may determine that this event is indicative of the network connection being in the normal state. Accordingly, if the number of required events is not satisfied in a given time period, the state application 235 may generate a signal for the mode application 240 that the network connection is in the normal state.

In addition to the above noted manner of switching from the high power mode to the normal mode based on a signal generated by the state application 235, the mode application 240 may determine if other types of conditions are met to switch from the high power state to the normal state. In a first example, the mode application 240 may determine when a user activity is detected. Specifically, when the settings of the high power mode includes the user experience setting described above, the user experience is to be minimally impacted. Thus, any user activity at the UE 110 may be assumed to require a return of the settings to the normal mode so that all operations and functionalities that are being utilized by the user is available. For example, if the display device 215 is activated or a user application is opened, the mode application 240 may assume that the normal operations of the UE 110 are to be made available, including all network connectivity operations. Accordingly, when a user activity is detected, the mode application 240 may exit out of the high power mode and its corresponding settings and use the normal mode and its corresponding settings.

In a second example, the mode application 240 may receive measurement information from the state application 235. Specifically, the state application 235 may monitor and measure various connectivity parameters indicating the radio conditions. For example, the state application 235 may measure the RSRP. The measurement values of the RSRP may be provided to the mode application 240. When the mode application 240 determines that there is at least a predetermined improvement to the measured radio condition, the mode application 240 may utilize the normal mode and come out of the high power mode. For example, the RSRP may be measured at −120 dbm at a first time and subsequently improves to −100 dbm at a second time. This improvement of 20 dbm may be the predetermined improvement or a greater improvement than the predetermined improvement. In another example, the RSRP may be improved above a predetermined minimum threshold. Accordingly, when a predetermined improvement amount is determined in a measured radio condition, the mode application 240 may exit out of the high power mode and its corresponding settings and use the normal mode and its corresponding settings.

In a third example, the mode application 240 may determine if there has been a successful reselection to a new cell. As described above, after the mode application 240 has activated the settings corresponding to the high power mode when the network connection is in the high power state, the pre-RLF application 245 may be used to select a new cell via an early RLF indication in which a normal RLF procedure may be performed (although it is also noted that the pre-RLF application 245 does not require the UE 110 to be in the high power mode for its functionality to be performed). The processor 205 may also perform a normal RLF procedure when an actual RLF is determined. By performing the RLF procedure, the UE 110 may then perform a handover to a new cell. When a successful handover has been performed in which a new cell is selected, the mode application 240 may assume that the new cell is better than the previous cell and the network connection is in the normal state. Accordingly, when a successful reselection to a new cell is determined, the mode application 240 may exit out of the high power mode and its corresponding settings and use the normal mode and its corresponding settings.

In a fourth example, the mode application 240 may utilize a guard timer. The guard timer may be a time limit that the high power mode and the corresponding settings are to be used before the normal mode and the corresponding settings are to be used. Thus, if the mode application 240 has been using the high power mode for the entire duration of the guard timer (e.g., the guard timer has expired), the mode application 240 may automatically exit out of the high power mode and enter the normal mode even though the network connection may still be determined to be in the high power mode. For example, the guard timer may be set to 5 minutes. Thereafter, the normal mode may be used for at least some period of time before re-entering the high power mode from the network connection continuing to be determined in the high power state. Specifically, as described above, the mode application 240 may include a cooling timer to ensure that the high power mode is not continued endlessly by using a duration of time in which the high power mode is prevented from being re-entered after exiting the high power mode. Accordingly, when the guard timer has expired, the mode application 240 may exit out of the high power mode and its corresponding settings and use the normal mode and its corresponding settings.

Thus, when any one or more of the above conditions is determined, the mode application 240 may return to the normal mode and activate the corresponding settings. However, since the settings corresponding to the high power mode are used for at least some time when the network connection is identified to be in the high power state, the UE 110 is capable of conserving more power than if the UE 110 stays in the normal mode the entire time.

Figure 3:
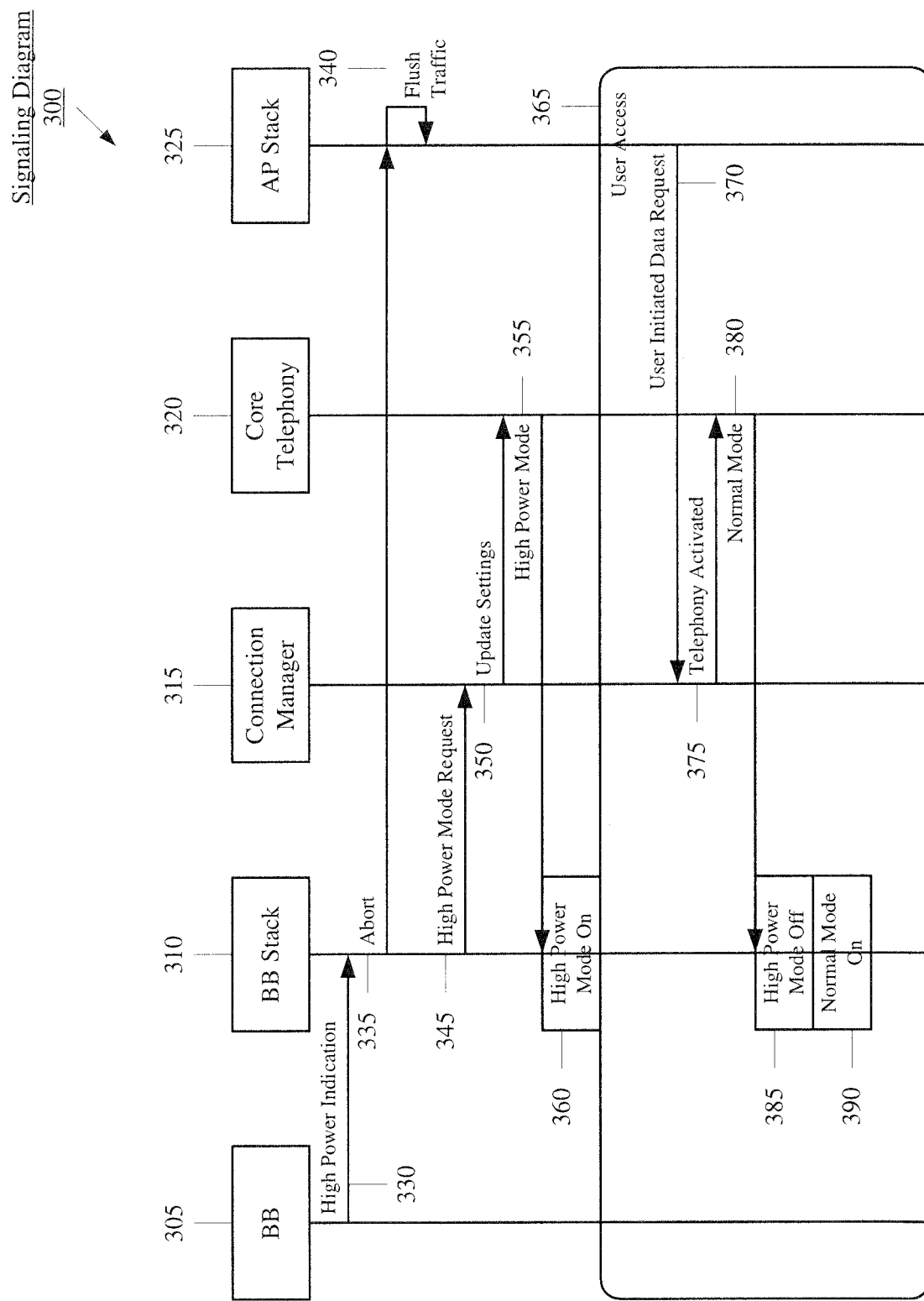
FIG. 3 shows a signaling diagram of utilizing a high power mode according to the various exemplary embodiments described herein.

FIG. 3 shows a signaling diagram 300 of utilizing a high power mode according to the various exemplary embodiments described herein. Specifically, the signaling diagram 300 may relate to a set of operations performed to identify that a network connection between the UE 110 and a base station of the LTE-RAN 122 is in the high power state such that the settings of the high power mode are activated. The signaling diagram 300 relates to operations performed by a plurality of components including a baseband (BB) processor 305, a BB stack 310, a connection manager 315, a core telephony 320, and an applications processor (AP) stack 325. As noted above, the processor 205 may represent a baseband processor. Accordingly, the BB 305 and the BB stack 310 may be implemented by the processor 205. The connection manager 315, the core telephony 320, and the AP stack 325 may be high layer functionalities of an overall processing component of the UE 110.

As illustrated, the BB 305 may transmit a high power indication 330 to the BB stack 310. As noted above, the high power indication 330 may be based on detecting a predetermined number of different events indicative of the network connection being in the high power state. Thus, the BB stack 310 may transmit an abort signal 335 to the AP stack 325. The abort signal 335 may cause the AP stack 325 to flush 340 discretionary traffic that is still in networking buffers such that a TCP reset may be sent for this flow. It is noted that the IP context may be saved. The BB stack 310 may also transmit a high power mode request 345 to the connection manager 315. The connection manager 315 may represent a component that manages how select network functionalities are to be used (e.g., activating or deactivating the select functionalities). Specifically, the connection manager 315 may provide instructions for the core telephony 320 that manages performance of these select functionalities. Accordingly, the connection manager 315 may update 350 certain settings. The update 350 may be to deactivate telephony functionalities (e.g., select incoming and outgoing calls/messaging) while maintaining emergency service functionalities (e.g., outgoing emergency calls or incoming emergency messages). When the connection manager 320 receives the update 350, a mode of the BB 305 may be converted to the high power mode. Thereafter, the core telephony 320 may transmit a high power mode instruction 355 to the BB stack 310 such that a high power mode 360 is activated and further settings thereof are activated.

At a subsequent time, a user access 365 may be detected (e.g., at the AP stack 325). As described above, the user access 365 may represent any condition upon which the UE 110 is to exit the high power mode and its corresponding settings and return to the normal mode and its corresponding settings. Thus, the AP stack 325 may transmit a user initiated data request 370 corresponding to the user access 365 to the connection manager 315. The connection manager 315 may transmit a further update 375 to the core telephony 320. Since the normal mode is to be used, the further update 375 may be an instruction to activate the telephony functionality. The core telephony 320 may transmit normal mode instruction 380 to the BB stack 310 such that a high power mode 385 is deactivated and settings thereof are deactivated while a normal mode 390 is activated and settings thereof are activated.

Figure 4:
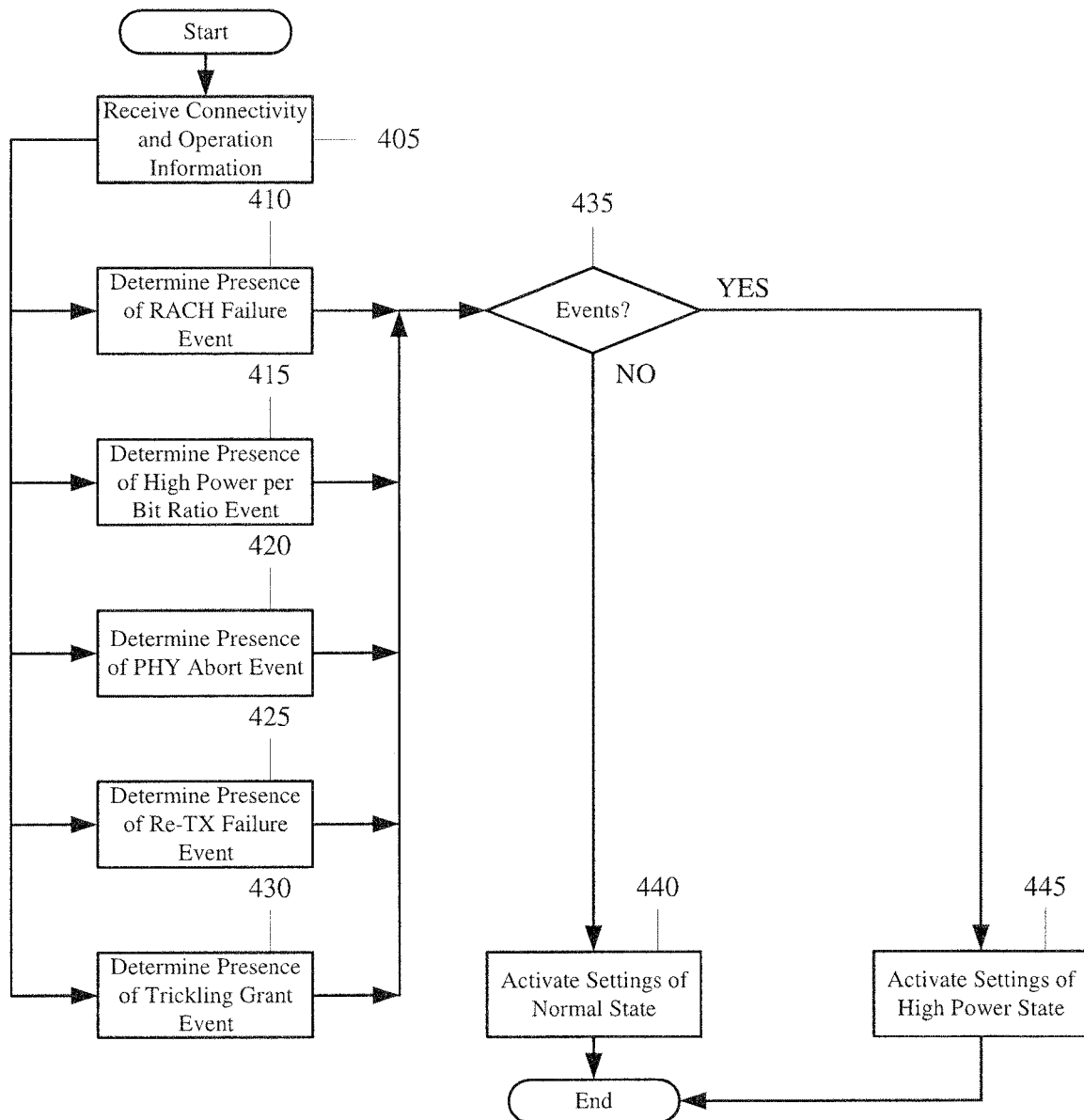
FIG. 4 shows a method for determining settings to be used corresponding to an identified mode according to the various exemplary embodiments described herein.

FIG. 4 shows a method 400 for determining settings to be used corresponding to an identified mode according to the various exemplary embodiments described herein. Specifically, the mode may be based on a state that is identified for a network connection. The method 400 relates to how the UE 110 utilizes connectivity and operation information being experienced by the UE 110 within a time period up to a current time. The method 400 may be performed by the state application 235 and the mode application 240. The method 400 will be described with regard to the network arrangement 100 of FIG. 1 and the UE 110 of FIG. 2.

In 405, the UE 110 receives connectivity and operation information. The receiving of this information may entail a variety of different mechanisms. For example, the UE 110 may receive connectivity information from the LTE-RAN 122. In another example, the UE 110 may determine various connectivity parameters or measurements based on information gathered by the UE 110 and/or received from the LTE-RAN 122. In a further example, the UE 110 may monitor the operations associated with the network connection. Based on the connectivity and operation information, the presence of various events may be detected.

In 410, the presence of a first event may be determined using the connectivity and operation information. Specifically, the UE 110 may determine if there has been a RACH failure. As described above, the RACH failure event may relate to whether a RACH has been established for synchronization purposes to perform an operation using the network connection. Thus, a RACH failure event may be indicative of the network connection being in the high power state. The UE 110 may then continue to 435 which will be described in further detail below.

In 415, the presence of a second event may be determined using the connectivity and operation information. Specifically, the UE 110 may determine whether uplink transmissions and uplink re-transmissions are requiring a high amount of power. As described above, the high power per bit ratio event may relate to the actual amount of power required in an uplink transmission and in an uplink re-transmission compared to a corresponding expected amount of power that should be required. The number of uplink transmissions and the number of uplink re-transmissions that require a power greater than the expected amount of power may be tracked such that if the number of these uplink transmissions and uplink re-transmissions exceed a corresponding predetermined threshold, more additional power is consistently required for uplink transmissions and uplink re-transmissions. Thus, the high power per bit ratio event may be indicative of the network connection being in the high power state. The UE 110 may then continue to 435.

In 420, the presence of a third event may be determined using the connectivity and operation information. Specifically, the UE 110 may determine if there has been a PHY abort indication. As described above, the PHY abort event may relate to measuring the MTPL and the PUSCH transmit power. When the difference between these values exceeds a predetermined threshold, a first criteria of the PHY abort event may be detected. The PHY abort event may also relate to determining an uplink BLER value. When the uplink BLER value is greater than a predetermined threshold, a second criteria of the PHY abort event may be detected. Accordingly, higher uplink transmit power and a high uplink BLER value may cause the UE 110 to utilize additional power in performing uplink transmissions. Thus, a PHY abort event may be indicative of the network connection being in the high power state. The UE 110 may then continue to 435.

In 425, the presence of a fourth event may be determined using the connectivity and operation information. Specifically, the UE 110 may determine if there has been a re-transmission failure. As described above, the re-transmission failure event may relate to a maximum number of re-transmission attempts that are performed for an unsuccessfully transmitted packet. As a packet loss percentage is intended to be kept under a minimum threshold, a packet transmission procedure may include re-transmission attempts up to a maximum number. If the packet fails to successfully be transmitted by the maximum number of attempts or if the number of re-transmissions are consistently (e.g., an average number for packets transmitted over a period of time) a predetermined percentage of the maximum number (e.g., 80%), the continuous attempts may drain power from the UE 110. Thus, a re-transmission failure event may be indicative of the network connection being in the high power state. The UE 110 may then continue to 435.

In 430, the presence of a fifth event may be determined using the connectivity and operation information. Specifically, the UE 110 may determine if the LTE-RAN 122 gives low grant sizes over a period of time. As described above, the grant event may entail smaller transmission sizes such that the UE 110 is required to activate the transceiver 225 more frequently and utilizing additional power than if larger transmission sizes were granted and used. Thus, a grant event may be indicative of the network connection being in the high power state. Thus, a grant event may be indicative of the network connection being in the high power state. The UE 110 may then continue to 435.

After determining whether the RACH failure event, the high power per bit ratio event, the PHY abort event, the re-transmission failure event, and the grant event have been detected, in 435, the UE 110 determines if a number of different events is greater than a predetermined threshold. For example, the UE 110 may require that at least three different events be present to reliably identify when the network connection is in the high power state. Otherwise, the UE 110 may identify the network connection to be in the normal state where detection of none or at least one event less than the predetermined threshold may be within acceptable operational parameters for the network connection.

If the required number of different events is not met, in 440, the UE 110 identifies the network connection to be in the normal state and sets a normal mode to use the settings of the normal mode. However, if the required number of different events is met, in 445, the UE 110 identifies the network connection to be in the high power state and sets a high power mode to use the settings of the high power mode. As described above, the settings of the high power mode may entail allowing only emergency services (e.g., outgoing emergency calls or incoming emergency messages) while disallowing all other incoming/outgoing user activity, discretionary traffic, etc. In this manner, the UE 110 may conserve power by minimizing cellular usage while the network connection is in the high power state.

It is noted that the method 400 is illustrated with 410, 415, 420, 425, and 430 running in parallel. However, the use of a parallel operation and determining the presence of each event is only exemplary. In another exemplary embodiment, the UE 110 may determine the presence of the events with an order or sequentially. For example, if performed sequentially, the UE 110 may stop determining the presence of the events if the predetermined threshold for the number of events has been met. The UE 110 may also stop determining the presence of the events if the remaining events to be determined cannot satisfy the predetermined threshold even if the remaining presences were detected. In another example, the UE 110 may utilize a particular order based on priority or importance of detecting the event.

It is also noted that method 400 may be an iterative process so long as the UE 110 is being used or activated. For example, while the UE 110 is activated, after 440 or 445, the method 400 may return to 405 to continue to determine whether the settings of the corresponding mode are to be maintained or changed to the other settings of the corresponding other mode. Furthermore, the method 400 may be performed over a period of time. For example, prior to 405, a determination may be made as to whether a new period of time is reached. If not reached, the current period of time may continue to run to monitor for the events. If reached, the new period of time may begin and the operations to detect the events may be performed. When the period of time has ended, the UE 110 may then continue to 435.

It is further noted that the method 400 may incorporate further operations to incorporate further features such as those described above. For example, the method 400 may include an operation to determine whether there should be a delay prior to activating the settings of the high power mode. As described above, the delay may be due to variety of factors such as whether a voice call is currently active, foreground user data traffic is currently ongoing, the display device 215 is activated, or a cooling timer is still running. Thus, the method 400 may include operations to verify these conditions prior to activating the settings of the high power mode.

Figure 5:
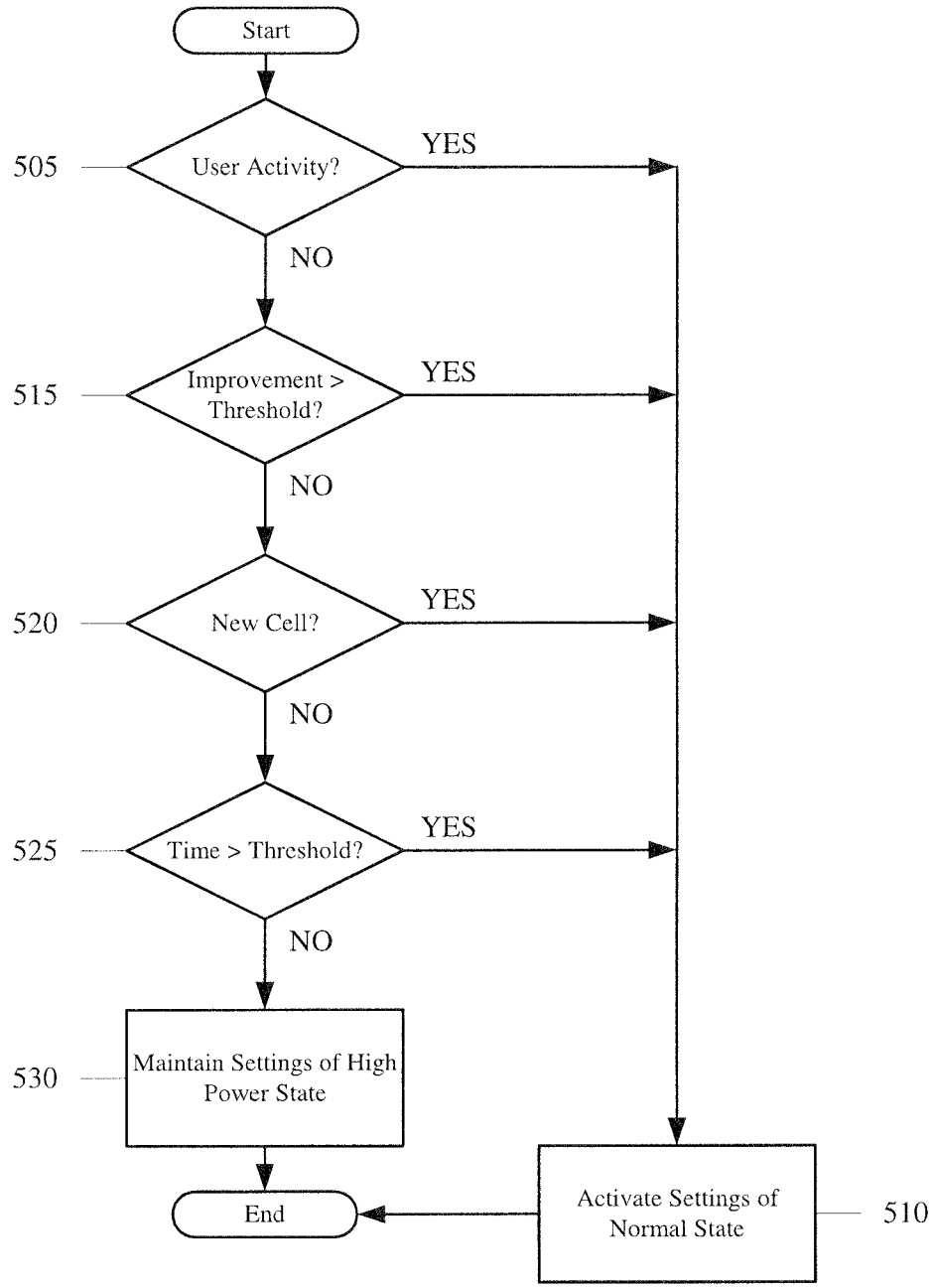
FIG. 5 shows a method for determining settings to be used when in a high power mode according to the various exemplary embodiments described herein.

FIG. 5 shows a method 500 for determining settings to be used when in a high power mode according to the various exemplary embodiments described herein. The method 500 relates to how the UE 110 is already in the high power mode and based on one or more factors may select to return to a normal mode or remain in the high power mode. Thus, the method 500 may assume that the UE 110 is currently using the settings of the high power mode. The method 500 may be performed by the state application 235 and the mode application 240. The method 500 will be described with regard to the network arrangement 100 of FIG. 1 and the UE 110 of FIG. 2.

In 505, the UE 110 determines whether there is any user activity. As described above, the settings of the high power mode may be a user experience setting instead of a power conservation setting. Thus, the user experience may be intended to be minimally impacted to allow for operation selected by the user to be allowed. Thus, if there is user activity, the UE 110 continues to 510 where the high power mode and its corresponding settings are terminated and the normal mode and its corresponding settings are activated.

In 515, the UE 110 determines if a measured radio condition has had an improvement that is greater than a predetermined threshold amount. For example, the UE 110 may measure a RSRP while the network connection was identified to be in the high power state (e.g., −120 dBm). However, at a subsequent time while the UE 110 remained in the high power mode, the RSRP may be measured (e.g., −100 dBm) and determined to greatly improve to a degree that satisfies the predetermined threshold amount (e.g., at least a 20 dBm increase). In this manner, the UE 110 may assume that the network connection may now be identified to be in the normal state. Thus, if there is an improvement that satisfies a corresponding improvement criteria, the UE 110 continues to 510.

In 520, the UE 110 determines if a successful re-selection to a new cell has been performed. Specifically, the UE 110 may determine whether a first network connection to a first base station of a first cell identified as being in the high power state has been handed over to a second network connection to a second base station of a second cell identified (or assumed) as being in the normal state. For example, the UE 110 may have a RLF that triggers the handover procedure to be performed. In another example, as described above, the pre-RLF application 245 may be used if the conditions are met to trigger the handover procedure to be performed. Thus, if a handover to a new cell is determined, the UE 110 continues to 510.

In 525, the UE 110 determines if the amount of time that the UE 110 has been in the high power mode and using the corresponding settings has exceeded a guard timer. As described above, the guard timer may ensure that the UE 110 does not constantly remain in the high power mode. Thus, if the guard timer has expired, the UE 110 continues to 510.

However, if none of the above conditions have been met, in 530, the UE 110 maintains the settings of the high power mode where the network connection is identified to be in the high power state.

It is noted that the determination of the conditions represented in 505, 515, 520, and 525 is not in any particular order. That is, the method 500 is not required to perform 505, 515, 520, and 525 in the order shown in FIG. 5. In contrast, the method 500 may be modified such that the UE 110 constantly monitors the presence of any of these conditions where a detection of any one condition leads the method 500 to 510.

Figure 6:
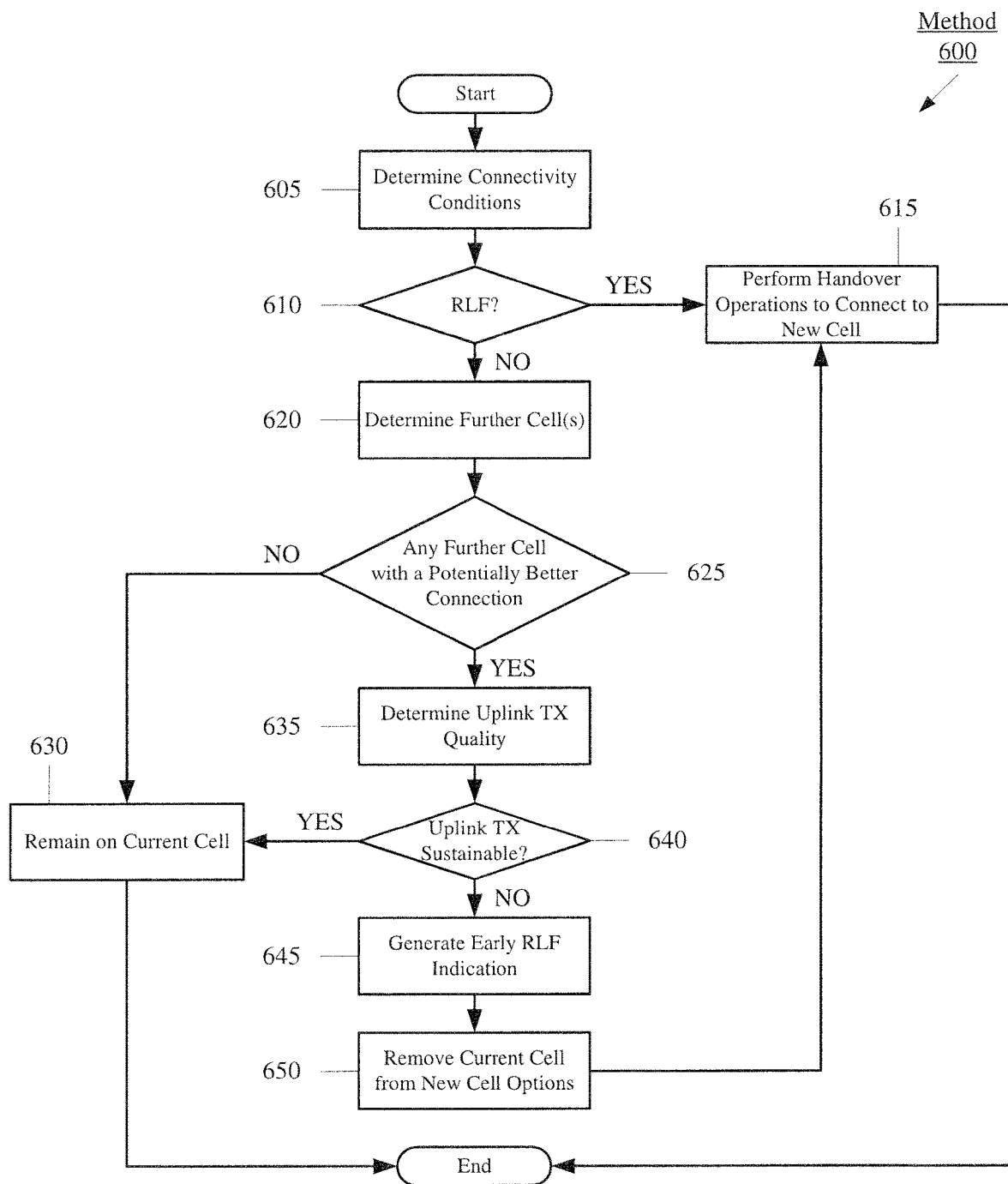
FIG. 6 shows a method for utilizing a pre-radio link failure operation according to the various exemplary embodiments described herein.

FIG. 6 shows a method 600 for utilizing a pre-RLF operation according to the various exemplary embodiments described herein. The method 600 relates to how the UE 110 may perform a particular operation when in a high power mode or in an independent fashion. Specifically, the UE 110 may utilize a pre-RLF procedure that triggers RLF operations to be performed despite a genuine RLF not being determined. Thus, the UE 110 may attempt a handover from a current cell to a new cell that may allow the UE 110 to not be (or assumed to not be) in a high power state. The method 600 may be performed by the pre-RLF application 245. The method 600 will be described with regard to the network arrangement 100 of FIG. 1 and the UE 110 of FIG. 2.

In 605, the UE 110 determines connectivity conditions. The UE 110 may determine whether various connectivity operations has indicated particular results. Specifically, the UE 110 may use information corresponding to uplink transmission operations to determine whether there has been a RLF. Thus, in 610, the UE 110 determines if there has been a RLF. If there has been a RLF, the UE 110 continues to 615 where a handover procedure is performed to disconnect from a first current base station of a first cell and connect to a second new base station of a second cell.

If there has not been a RLF, the UE 110 continues to 620. In 620, the UE 110 may utilize the feature of the pre-RLF application 245. Thus, the UE 110 may first determine if there are any further cells to potentially perform a handover procedure. In 625, the UE 110 may also determine if any of the further cells will potentially provide an improved network connection than currently provided by the current cell. If no further cell satisfies this criteria, the UE 110 continues to 630 where the UE 110 remains on the current cell as a handover to a worse cell may create a worse high power situation.

However, if at least one of the further cells is identified as a potential candidate, in 635, the UE 110 determines the current uplink transmission quality. As described above, the pre-RLF application 245 may be based on how well the UE 110 performs uplink transmissions and whether the network connection provides a sustainable uplink transmission pathway for uplink transmissions. Thus, in 640, the UE 110 determines whether the current uplink transmission pathway with the current cell is sustainable. For example, sustainability may relate to a power being used for uplink transmissions or an uplink BLER. If the uplink transmission pathway is sustainable, the UE 110 may select to remain on the current cell (despite a potentially better cell being available).

However, if the uplink transmission pathway is not sustainable, in 645, the UE 110 generates an early RLF indication. The early RLF indication may be a measurement report that is generated to indicate a RLF despite no actual RLF being present. Accordingly, the current cell may issue a handover command to the UE 110. Prior to transmitting the early RLF indication and to avoid returning to the current cell, in 650, the UE 110 may remove the current cell from handover cell options. The UE 110 may then continue to 615.

It is noted that the sequence shown for the method 600 is only exemplary. The method 600 may be modified such that the operations are performed in a different order or in a parallel manner. For example, the determination of further cells (e.g., 620) and/or whether these further cells are better than the current cell (e.g., 625) may be performed after the uplink transmission pathway has been determined to not be sustainable (e.g., 640).

The exemplary embodiments are described above with many different events that may cause the UE 110 to utilize a high power mode when a network connection is identified to be in a high power state. However, the exemplary embodiments may also be configured to consider further factors that may affect how the operations according to the exemplary embodiments are utilized. In a particular example, the UE 110 may be experiencing a high mobility (e.g., a high rate of speed). When such a condition is determined, the UE 110 may delay the mode application 240 from activating the settings of the high power mode despite a positive determination for activation since the events that are detected may be caused from this mobility. When the mobility is no longer registered, the state application 235 may again be used to confirm or deny that the network connection is still in the high power mode.

The exemplary embodiments provide a device, system, and method of providing a high power mode when a network connection is identified to be in a high power state. The high power state may be a condition where the network connection requires additional power to perform operations (e.g., uplink transmissions) than if the network connection is in a normal state and within acceptable operational parameters. Accordingly, the high power mode may include settings to minimize cellular usage to improve power conservation while the network connection remains in the high power state. The high power mode may also consider the user experience to balance the power conservation feature while still availing the user of the capabilities of the UE. In a particular manner of removing the UE from the high power mode, a successful re-selection to a new cell may be a trigger. Accordingly, a pre-RLF operation based on a poor uplink transmission pathway (without an actual RLF) may be used to attempt a handover procedure to be performed.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a device that is configured to establish a network connection to a network through a base station of the network:
   determining uplink transmission parameters indicative of a sustainability of an uplink communication pathway of the network connection;
   determining whether radio link failure (RLF) criteria are met indicating an RLF event has occurred;
   when the RLF criteria are not met and when the uplink transmission parameters are outside a predetermined acceptable operational range, identifying the uplink communication pathway of the network connection to be unsustainable;
   when the uplink communication pathway of the network connect is identified to be unsustainable, generating a measurement report indicating the RLF event has occurred despite the RLF criteria not being met; and
   transmitting the measurement report to the base station intended to trigger a handover procedure to a further base station of the network.

2. The method of claim 1, further comprising:
   removing the base station from an acquisition list considered for the handover procedure to prevent returning to the base station.

3. The method of claim 1, further comprising:
determining the further base station will provide an improved network connection compared with the base station.

4. The method of claim 3, further comprising:
performing a handover procedure to disconnect from the base station and connect to the further base station.

5. The method of claim 4, wherein performing the handover procedure causes the device to switch from a first power state to a second power state, wherein the first power state is higher than the second power state.

6. The method of claim 1, wherein the uplink transmission parameters comprise at least one of a transmit power or an uplink block error ratio (BLER).

7. The method of claim 6, wherein determining uplink transmission parameters comprises determining a required transmit power is greater than a maximum allowed transmit power, wherein the maximum allowed transmit power is determined based on device capability or power back-off limits for a specific absorption rate.

8. A user equipment (UE), comprising:
a transceiver configured to establish a network connection to a network through a base station of the network; and
a processor coupled to the transceiver configured to:
determine uplink transmission parameters indicative of a sustainability of an uplink communication pathway of the network connection;
determine whether radio link failure (RLF) criteria are met indicating an RLF event has occurred;
when the RLF criteria are not met and when the uplink transmission parameters are outside a predetermined acceptable operational range, identify the uplink communication pathway of the network connection to be unsustainable; and
when the uplink communication pathway of the network connect is identified to be unsustainable, generate a measurement report indicating the RLF event has occurred despite the RLF criteria not being met,
wherein the transceiver is further configured to transmit the measurement report to the base station intended to trigger a handover procedure to a further base station of the network.

9. The UE of claim 8, wherein the processor is further configured to:
remove the base station from an acquisition list considered for the handover procedure to prevent returning to the base station.

10. The UE of claim 8, wherein the processor is further configured to:
determine the further base station will provide an improved network connection compared with the base station.

11. The UE of claim 10, wherein the processor is further configured to:
perform a handover procedure to disconnect from the base station and connect to the further base station.

12. The UE of claim 11, wherein performing the handover procedure causes the device to switch from a first power state to a second power state, wherein the first power state is higher than the second power state.

13. The UE of claim 8, wherein the uplink transmission parameters comprise at least one of a transmit power or an uplink block error ratio (BLER).

14. The UE of claim 13, wherein determining uplink transmission parameters comprises determining a required transmit power is greater than a maximum allowed transmit power, wherein the maximum allowed transmit power is determined based on device capability or power back-off limits for a specific absorption rate.

15. An integrated circuit configured for use in a device that is configured to establish a network connection to a network through a base station of the network, comprising:
circuitry configured to determine uplink transmission parameters indicative of a sustainability of an uplink communication pathway of the network connection;
circuitry configured to determine whether radio link failure (RLF) criteria are met indicating an RLF event has occurred;
circuitry configured to, when the RLF criteria are not met and when the uplink transmission parameters are outside a predetermined acceptable operational range, identify the uplink communication pathway of the network connection to be unsustainable; and
circuitry configured to, when the uplink communication pathway of the network connect is identified to be unsustainable, generate a measurement report indicating the RLF event has occurred despite the RLF criteria not being met,
wherein a transceiver is further configured to transmit the measurement report to the base station intended to trigger a handover procedure to a further base station of the network.

16. The integrated circuit of claim 15, further comprising:
circuitry configured to remove the base station from an acquisition list considered for the handover procedure to prevent returning to the base station.

17. The integrated circuit of claim 15, further comprising:
circuitry configured to determine the further base station will provide an improved network connection compared with the base station.

18. The integrated circuit of claim 17, further comprising:
circuitry configured to perform a handover procedure to disconnect from the base station and connect to the further base station.

19. The integrated circuit of claim 18, wherein performing the handover procedure causes the device to switch from a first power state to a second power state, wherein the first power state is higher than the second power state.

20. The integrated circuit of claim 15, wherein the uplink transmission parameters comprise at least one of a transmit power or an uplink block error ratio (BLER), wherein determining uplink transmission parameters comprises determining a required transmit power is greater than a maximum allowed transmit power, and wherein the maximum allowed transmit power is determined based on device capability or power back-off limits for a specific absorption rate.

* * * * *